Oct. 9, 1923.
C. H. RICH
FIRE FIGHTING TOOL
Filed Feb. 21, 1921
1,469,957
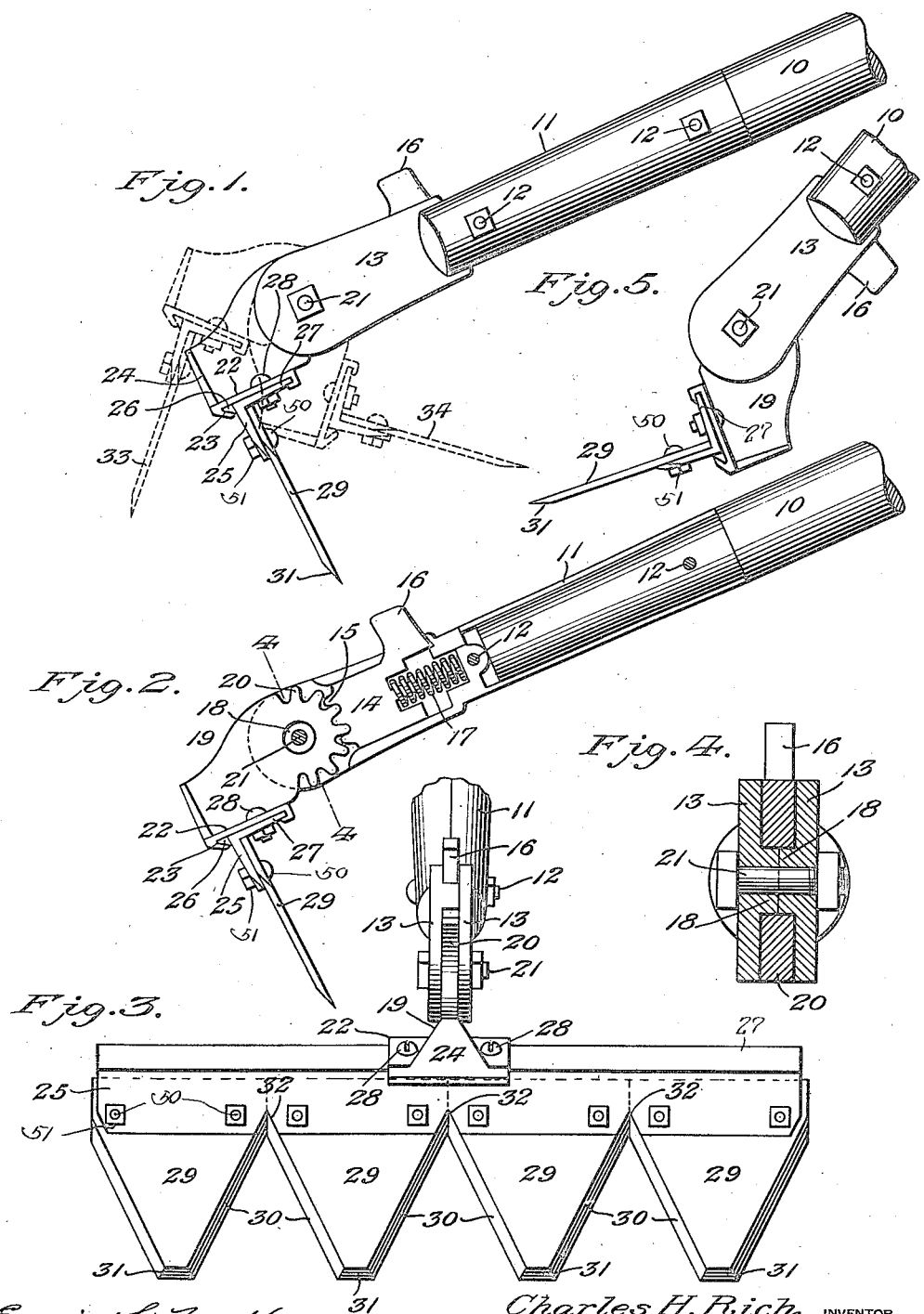
Charles H. Rich, INVENTOR Patented Oct. 9, 1923.

1,469,957

UNITED STATES PATENT OFFICE.

CHARLES H. RICH, OF WOOLRICH, PENNSYLVANIA.

FIRE-FIGHTING TOOL.

Application filed February 21, 1921. Serial No. 446,975.

*To all whom it may concern:*

Be it known that I, CHARLES H. RICH, a citizen of the United States, residing at Woolrich, in the county of Clinton and State of Pennsylvania, have invented new and useful Improvements in Fire-Fighting Tools, of which the following is a specification.

This invention comprehends the provision of a tool designed for use in fighting forest fires or the like, the tool embodying a handle and head to which are secured a plurality of blades, the head being susceptible of adjustment so as to position the blades at various angles with respect to the handle, such as is necessary to permit of use of the tool in the capacity of a brush cutter, a rake for leaves and brush, a fork or shovel designed to effectively handle burning brands, and to also provide a mulch hoe.

The nature and advantages of the invention will be better understood when read in connection with the accompanying drawing, the invention residing in the combination, construction and arrangement of parts as claimed.

In the drawing forming part of this application, like numerals of reference indicate similar parts in the several views and wherein:

Figure 1 is a side elevation of the tool showing by full lines the position of the head and blades when the tool is used as a rake and as a mulch hoe, and by dotted lines the different positions of the head and blades when the tool is used in the capacities of a rake for leaves, and a tool for cutting brush, weeds and the like.

Figure 2 is a side elevation of the tool partly in section.

Figure 3 is a front elevation of the tool.

Figure 4 is a sectional view taken on line 4—4 of Figure 2.

Figure 5 is a detail view showing the position of the blades when the tool is used as a fork or shovel for handling burning brands.

The tool forming the subject matter of my invention comprises a handle 10 which may be of any suitable length and is received by a socket 11. The socket 11 is preferably made in two sections which are bolted or otherwise suitably secured together as at 12, one bolt being passed through the adjacent end of the handle 10 to also secure the socket and handle together. Projecting from the forward ends of the socket members are spaced parallel portions 13 between which is slidably mounted a dog 14 the forward end of which is provided with teeth 15. The dog is formed with a thumb engaging portion 16 which projects through the slot defined by the space between the parallel portions 13 of the socket member. The dog is normally held in its forward position for a purpose to be hereinafter described, through the instrumentality of a coiled spring 17. Each of the parallel portions 13 has its inner side formed with a boss 18 and these bosses are arranged in face to face contact when the parts are operatively associated as clearly shown in Figure 4, to provide a bearing for the connecting member which associates the head of the tool with the handle 10. This connecting member is indicated generally by 19 and embodies a toothed portion 20 which is journaled upon the bosses 18 as illustrated in Figure 4, whereby the connecting member 19 and the head of the tool is afforded a free pivotal movement without any possibility of binding, the parts to be fitted to a nicety for this purpose. A fastening element such as a bolt or the like indicated at 21 is passed through the parallel portions 13 and the bosses 18 thereof to hold these parts operatively associated. The connecting member 19 also comprises a base plate 22 of channel formation in cross section to provide grooves or channels 23, while projecting at a right-angle from the base plate 22 is a flange 24 which is merged into the toothed portion 20. This construction affords the connecting member maximum strength, while the flange 24 provides a wall which to some extent protects the manipulating portion 16 of the dog from being injured while the tool is being used for handling burning brands or the like.

The head of the tool comprises an angle bar of substantially T-shaped formation in cross section, the body portion of this bar being indicated at 25, while the cross piece is made up of unequal portions 26 and 27 respectively. The flange or portion 27 is relatively wide as compared to the portion 26, and is bolted or otherwise suitably secured as at 28 to the base plate 22 of the connecting member 19. The cross piece of the head 25 of the tool is slidably fitted in the grooves or channels 23, and in this manner the head is effectively associated with the connecting member 19. The blades of the tool are indicated at 29 and are fixedly secured to the body portion of the angle bar 25 in any suitable manner as through the medium of the bolts 50 and nuts 51, there being two bolts and two nuts to each blade for the connection thereof to the body portion of the angle bar 25. The blades are provided with inclined edges 30 which together with the lower end 31 are beveled to provide cutting edges. In order to provide a continuity of the adjacent cutting edges 30 of the respective blades upwardly beyond the lower edge of the body portion 25 of the angle bar, said edge is notched as at 32. As clearly shown in Figures 1, 2 and 5, the flange 27 of the head is opposed to the heel ends of the blade 29.

As hereinabove stated, this tool is primarily intended for use in fighting forest fires or the like, and its construction is such that the blades can be swung into different angles with respect to the handle and held in any given position so that the tool may be used in various capacities. For instance, when the blades are arranged in the position illustrated by full lines in Figure 1, the tool may be used as a mulch hoe, whereby deep mulch trenches may be made in order to prevent fire from continuing its course with a resultant burning of dry decayed vegetable matter. When the blades are swung to the position indicated by dotted lines at 33 in Figure 1 a tool is provided which may be used in the capacity of a rake, for raking leaves, brush or the like while cleaning the surface of the ground to prevent progress of the fire. The construction is such that when the tool is being used in this capacity, and drawn towards the operator, the blades will slip over stones, roots or any solid substances which make it possible to handle the tool for the purpose mentioned with great speed and efficiency. Again, when the blades are swung to the position illustrated at 34 in Figure 1, a tool is provided which is best suited for cutting brush, weeds or the like, so as to provide a clean surface in back firing in order to check the progress of the fire. The blades 29 in such use of the tool are adapted in virtue of their outwardly converged cutting edges to make drawn cuts and hence the tool can be efficiently operated with but little effort on the part of the operator. In Figure 5 I have illustrated another position which may be occupied by the blades, in which position the blades are almost on a straight line and parallel with the handle 10, thus producing a tool which having the broad blades may be used in the capacity of a fork or shovel to turn back all burning brands, which would otherwise communicate with unburned portions or twigs and prolong the fire. The head together with the blades 29 can be quickly and easily swung to any of the positions above enumerated by simply releasing the toothed portion 20 of the connecting member from the dog 14, which is accomplished by pressing the dog away from the toothed portion 20 against the tension of the spring 17. After the blades have been adjusted, the dog is released so as to engage the teeth of the attaching member, and thereby hold the blades fixed relatively to the handle. The invention is simple in construction, and is effective, and convenient as well as easy to manipulate as a fire fighting implement.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

A tool for fighting forest fires, comprising a handle, a head connected with the forward end of the handle and disposed crosswise thereof and adjustable about the connecting means as a center and having a rearwardly extending flange, means to adjustably fix the head with respect to the handle, and blades carried by the head and arranged side by side crosswise of the handle with their heel ends opposed to the said rearwardly extending flange, said blades having forward transverse cutting edges and oblique side edges, the adjacent side edges of any two adjacent blades converging at the head.

In testimony whereof I affix my signature

CHARLES H. RICH.